United States Patent
McDaniel et al.

(10) Patent No.: US 7,587,444 B2
(45) Date of Patent: Sep. 8, 2009

(54) DATA VALUE ADDITION

(75) Inventors: Micah Rone McDaniel, Austin, TX (US); Ann Sekli Chin, Austin, TX (US); Daniel Kershaw, Cambridge (GB)

(73) Assignee: ARM Limited, Cambridge (GB)

( * ) Notice: Subject to any disclaimer, the term of this patent is extended or adjusted under 35 U.S.C. 154(b) by 1047 days.

(21) Appl. No.: 11/114,238

(22) Filed: Apr. 26, 2005

(65) Prior Publication Data

US 2006/0242221 A1   Oct. 26, 2006

(51) Int. Cl.
*G06F 7/50* (2006.01)

(52) U.S. Cl. ............................. 708/709; 708/714

(58) Field of Classification Search ............. 708/709, 708/714

See application file for complete search history.

(56) References Cited

U.S. PATENT DOCUMENTS

| | | | | |
|---|---|---|---|---|
| 5,134,579 | A * | 7/1992 | Oki et al. ................ | 708/706 |
| 5,732,008 | A * | 3/1998 | Abu-Khater et al. ...... | 708/714 |
| 6,832,235 | B1 * | 12/2004 | Muramatsu et al. ....... | 708/710 |
| 7,149,768 | B2 * | 12/2006 | Dahan et al. ............. | 708/709 |
| 7,330,869 | B2 * | 2/2008 | Skull ..................... | 708/708 |
| 2001/0009010 | A1 * | 7/2001 | Sugeno et al. ............ | 708/209 |

* cited by examiner

*Primary Examiner*—Chuong D Ngo
(74) *Attorney, Agent, or Firm*—Nixon & Vanderhye P.C.

(57) ABSTRACT

A data processing apparatus for summing data values includes: a plurality of adder logic stages arranged in parallel; a control logic, in response to a request to sum two data values, to forward portions of the two data values to respective ones of the plurality of adder logic stages, each of the plurality of adder logic stages performing a carry propagate addition of the received portions to generate an intermediate sum, a propagate value and a carry; and further logic stages for combining the intermediate sums, carries and propagate values to produce a sum of the two data values. The control logic, further in response to a request to add a third data value to the sum before the further logic has completed sum, forwards portions of the third data value to respective ones of the plurality of adder logic stages, feedbacks the intermediate sums, and selectively feedbacks a carry generated from a preceding adder logic stage. The plurality of adder logic stages perform a carry propagate addition of the fedback intermediate sums and carrys with respective portions of the third data value to generate a plurality of further intermediate sums, further carrys and further propagate values. The further logic stages combine the further intermediate sums, carries and propagate values to produce a sum of the three data values.

14 Claims, 4 Drawing Sheets

Schematic of Integer Accumulator

DATA VALUE ADDITION

BACKGROUND OF THE INVENTION

1. Field of the Invention

This invention relates to the field of data processing systems. More particularly, this invention relates to the field of adding data values.

2. Description of the Prior Art

Data processing apparatus are being developed that can manipulate more data in shorter periods of time. As the size of data values being manipulated by data processing apparatus increases, while the cycle time of the apparatus continues to decrease, it becomes increasingly difficult to perform operations such as addition in a single cycle. Thus, the addition of wider data values often needs to be performed over two cycles. This makes it difficult to perform back-to-back accumulates with no bubble (e.g. R1=A+B, R2=R1+C).

U.S. Pat. No. 5,619,664 looks at this problem and addresses it by producing a redundant form result part way through an add. This result can be forwarded to a subsequent operation (e.g. an ADD, or memory reference) to speed up the subsequent operation as it does not need to wait for the final result, in some cases. In the case of the second operation being an add it performs a carry save addition on two data values that are to be added together and then if a third data value is to be added it feeds the intermediate sum and carry from the carry save addition back into the carry save addition circuit along with the third data value.

Other documents that consider the above problem are U.S. Pat. No. 4,868,777 and "Design Alternatives For Parallel Saturating Multioperand Adders" by Balzola et al. from "http//ce.et.tudelft.nl/publicationfiles/659_97iccd.pdf".

SUMMARY OF THE INVENTION

A first aspect of the present invention provides a data processing apparatus operable to sum data values, said data processing apparatus comprising: a plurality of adder logic stages arranged in parallel with each other; control logic operable in response to receipt of a request to sum two data values to forward portions of said two data values to respective ones of said plurality of adder logic stages, such that a first adder logic stage receives a predetermined number of lowest significant bits from each of said two data values and subsequent adder logic stages receive said predetermined number of successively higher significant bits from each of said two data values, each of said plurality of adder logic stages being operable to perform a carry propagate addition of said received portions to generate an intermediate sum, a propagate value and a carry; and further logic stages operable to receive said intermediate sums, carries and propagate values generated from said plurality of adder logic stages and to combine said received intermediate sums, carries and propagate values to produce a sum of said two data values wherein said control logic is operable in response to receipt of a request to add a third data value to said sum of said two data values, received before said further logic has completed said sum, to forward portions of said third data value to respective ones of said plurality of adder logic stages and to feedback said intermediate sums generated by said plurality of adder logic stages and to selectively feedback a carry generated from a preceding adder logic stage and said plurality of adder logic stages are operable to perform a carry propagate addition of said fedback intermediate sums and carrys with respective portions of said third data value to generate a plurality of further intermediate sums, further carrys and further propagate values and wherein said further logic stages are operable to receive said plurality of further intermediate sums, further carries and further propagate values and to combine said received further intermediate sums, carries and propagate values to produce a sum of said three data values.

The present invention recognises the problem of data value addition taking some time, particularly where the data values may be wide. This can lead to timing problems, in particular, where three data values are to be added, the third value being added to the sum of the first two. It addresses this problem by using an intermediate result of the sum of the first two data values to produce a final result of the three data value addition rather than waiting for the result of the sum of the two data values before starting the addition of the third value. The use of the intermediate sum and in some cases a carry is advantageous as this result is available earlier than the final sum and thus the sum of the three data values can be started earlier. The present invention manages to do this by using a carry propagate adder to add the initial two data values and produce an intermediate result. The properties of the carry propagate adder are such that the intermediate result produced by it can be used by it to add to the third data value. Thus, by simply feeding back the intermediate sum and selectively feeding back any carry value the third data value can be added to the first two data values before the final sum of the first two data values is known.

In some embodiments, said data values comprises at least two data elements said data processing apparatus being operable to process said at least two data elements in parallel in at least two data lanes, each of said at least two data elements comprising a multiple of said predetermined number of bits, said control logic being operable to inhibit said carry feedback between adder logic stages processing data elements from different data lanes and to feedback other carries.

Embodiments of the present invention are particularly appropriate to SIMD (single instruction multiple data) data processing, in which data elements are placed in parallel in data lanes within a single data value the same operations being performed on each data element within the single data value. In this case, an addition can be performed in parallel on each of the data elements by simply inhibiting carries being forwarded between data elements. Thus, embodiments of the present invention can be used for both normal addition and SIMD addition simply by inhibiting the carries in the SIMD case.

Although, said data element can be different sizes, in some embodiments the data element is the width of the adder logic stages and carries are inhibited between each adder logic stage. In other embodiments the data element may comprise the width of two or more adder logic stages, and carries are then only inhibited across data lanes, i.e. between different data elements.

In embodiments of the invention the carry comprises a single bit.

It is a feature of carry propagate adders that the carry is only a single bit wide. This is advantageous as only a single bit needs to be fed back for the carry, this is low in power and processor area requirements.

In preferred embodiments said predetermined number of bit comprises 8 bits.

Adder logic stages which add portions of data 8 bits wide have been found to be particularly advantageous as the additions can generally be performed in a single clock cycle of most data processing apparatus.

In some embodiments, said further logic comprises a plurality of carry resolve logic stages corresponding to said plurality of adder logic stages and operable to combine said carrys and propagate values from preceding stages to produce carry ins for each stage, said further logic being operable to combine said intermediate sums and carry ins to generate a sum of said data values.

In order to produce the final sum of the values the intermediate sum needs to be combined with a resolved carry to produce the result. The carry is resolved using carry resolve logic which combines carries and propagate values from preceding stages.

In some embodiments said further logic comprises first saturation detection logic operable to detect if said most significant intermediate sum should be saturated and to output a result; and second saturation detection logic operable to detect if said most significant intermediate sum incremented by one should be saturated and to output a result; said further logic being operable to select one of said outputs in response to a signal generated by said further logic.

In some embodiments, the use of a carry propagate adder in the initial stage of this addition to produce an intermediate result has been found to be advantageous in the case of deciding whether saturation is required or not. In particular, it has been found that if the further logic comprises saturation detection logic, this can be used to detect if the intermediate sum or the intermediate sum incremented by one needs to be saturated. By doing this within the further logic stage, the further logic is then able to select one of the saturation results when it is known whether the intermediate result is to be incremented or not. This is advantageous as whether the intermediate result is to be incremented or not is known late, thus, as soon as the further logic knows whether the sum is to be incremented or not it can determine if saturation is required or not.

In some embodiments, said signal generated by said further logic comprises a carry in signal generated by said carry resolve logic, said further logic selecting said output of said first saturation logic being operable to select a respective output of said first saturation logic in response to said carry in being zero and to select said output of said second saturation logic in response to said carry in being one.

Resolving the carries in parallel with determining saturation means that as soon as it is known whether a carry is present it is known whether the sum needs to be incremented and thus the appropriate saturation result can be selected.

In some embodiments, said further logic comprises first saturation detection logic operable to detect if at least two intermediate sums should be saturated, said at least two intermediate sums being said most significant intermediate sums derived from each of said at least two data elements, and to output at least two results and second saturation detection logic operable to detect if said at least two intermediate sums incremented by one should be saturated and to output at least two results, said further logic being operable to select at least two of said at least four results to be output in response to at least two signals generated by said further logic.

This saturation detection can also be used in embodiments where SIMD data is being processed. In such a case it is the most significant portions of data for each element which needs to be considered when saturation is decided upon. This can be simply done by arranging the saturation detection logic to analyse the intermediate sums of the appropriate data elements.

In some embodiments, said at least two signals generated by said further logic comprise a carry in signal generated by said at least two carry resolve logic stages corresponding to said at least two most significant intermediate sums derived from each of said at least two data elements, said further logic being operable to select a respective output of said first saturation logic in response to a carry in being zero and to select a respective output of said second saturation logic in response to a carry in being one.

Even in the case of SIMD processing, the carry resolve logic can be performed in parallel to the saturation detection and the carry in is then used to select the appropriate saturation value. In the SIMD case of course the intermediate carry values generated during the first stage are not passed between data lanes.

In some embodiments, said control logic is operable to generate said intermediate sum, propagate value and carry during a first step and said further logic stages are operable to produce said sum of said two data values during a second step and said control logic is operable in response to receipt of said request to add a third data value to said sum of said two data values to control said plurality of adder logic stages to generate a plurality of further intermediate sums, further carrys and further propagate values during said second step and said further logic stages are operable to combine said received further intermediate sums, carries and propagate values to produce a sum of said three data values during a third step.

Embodiments of the present invention are able to increase the speed of three data values being added together in a case where the request to add the third data value is received before the sum of the two data values have been added. In some cases, an intermediate sum value produced from the two data values is produced in a first step and in a subsequent step this can be fed back if a third data value is to be added. The complete result being performed in a third step.

In some embodiments, the first step, the second step and the third step can take a multiple number of cycles, although in preferred embodiments they generally take a single cycle each. Thus, in this case the three data values are added in three clock cycles and no bubbles are introduced.

A further aspect of the present invention provides a data processing method for summing data values said method comprising the steps of: in response to a request to add two data values: forwarding portions of said two data values to respective ones of a plurality of adder logic stages arranged in parallel, such that a first adder logic stage receives a predetermined number of lowest significant bits from each of said two data values and subsequent adder logic stages receive said predetermined number of successively higher significant bits from each of said two data values; performing a carry propagate addition on each of said received portions at each of said plurality of adder logic stages and generating an intermediate sum, a propagate value and a carry; and forwarding said intermediate sum, propagate value and carry to further logic stages and combining said intermediate sums, carries and propagate values within said further logic stages to produce a sum of said two data values; and in response to receiving a request to add a third data value to said sum of said two data values before producing said sum of said two data values: forwarding portions of said third data value to respective ones of said plurality of adder logic stages and feeding back said intermediate sum generated by each of said plurality of adder logic stages and selectively feeding back a carry generated from a preceding adder logic stage; performing a carry propagate addition of said fedback intermediate sums and carrys with said portions of said third data value within each of said plurality of adder logic stages to generate a plurality of further intermediate sums, further carrys and further propagate values; and forwarding said further intermediate sums, further carrys and further propagate values to said further logic stages and to combining said received further intermediate sums, carries and propagate values within said further logic stages to produce a sum of said three data values.

A yet further aspect of the present invention provides a means for data processing comprising: a plurality of adding means for adding data arranged in parallel with each other; control means operable in response to receipt of a request to sum two data values to forward portions of said two data values to respective ones of said plurality of adding means, such that a first adding means receives a predetermined number of lowest significant bits from each of said two data values and subsequent adding means receive said predetermined number of successively higher significant bits from each of said two data values, each of said plurality of adding means being operable to perform a carry propagate addition of said received portions to generate an intermediate sum, a propagate value and a carry; and further means for receiving said intermediate sums, carries and propagate values generated from said plurality of adding means and for combining said received intermediate sums, carries and propagate values to produce a sum of said two data values; wherein said control means is operable in response to receipt of a request to add a third data value to said sum of said two data values, received before said further means has completed said sum, to forward portions of said third data value to respective ones of said plurality of means for adding data and to feedback said intermediate sum generated by each of said plurality of means for adding data and to selectively feedback a carry generated from a preceding means for adding data; and each of said plurality of adding means is operable to perform a carry propagate addition of said fedback intermediate sums and carrys with said portions of said third data value to generate a plurality of further intermediate sums, further carrys and further propagate values; and wherein said further means is operable to receive said plurality of further intermediate sums, further carries and further propagate values and to combine said received further intermediate sums, carries and propagate values to produce a sum of said three data values.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
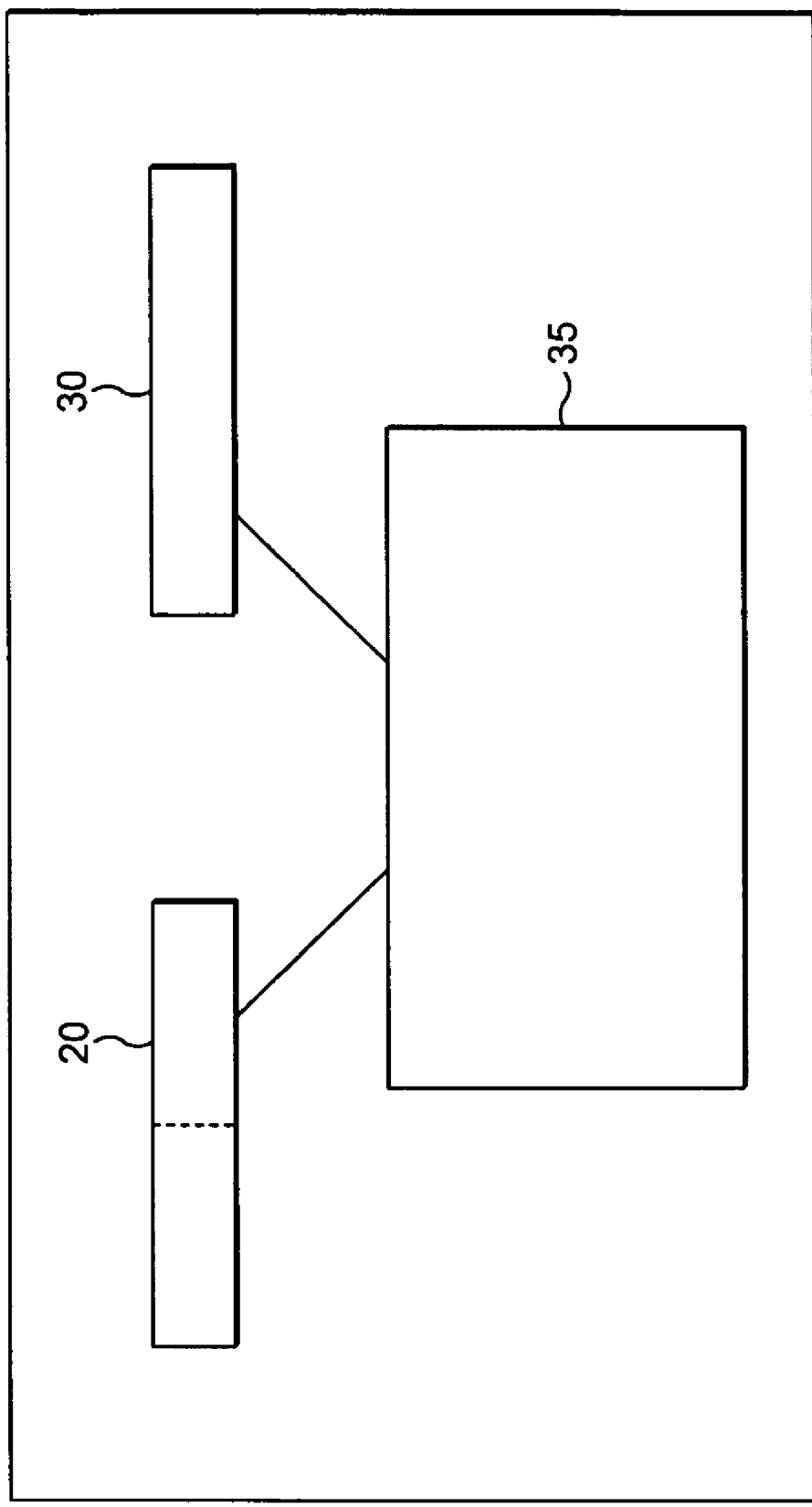
FIG. 1 schematically illustrates a data processor according to an embodiment of the present invention.

FIG. 1 schematically shows a data processing apparatus 10 comprising two registers 20 and 30 and an adder 35 according to an embodiment of the present invention. Two data values that are to be added together are input into the data processing apparatus 10 and are stored in registers 20 and 30 respectively. In the embodiment shown the data values are 64 bit data values and comprise two data elements each having 32 bits in two data lanes.

Figure 2:
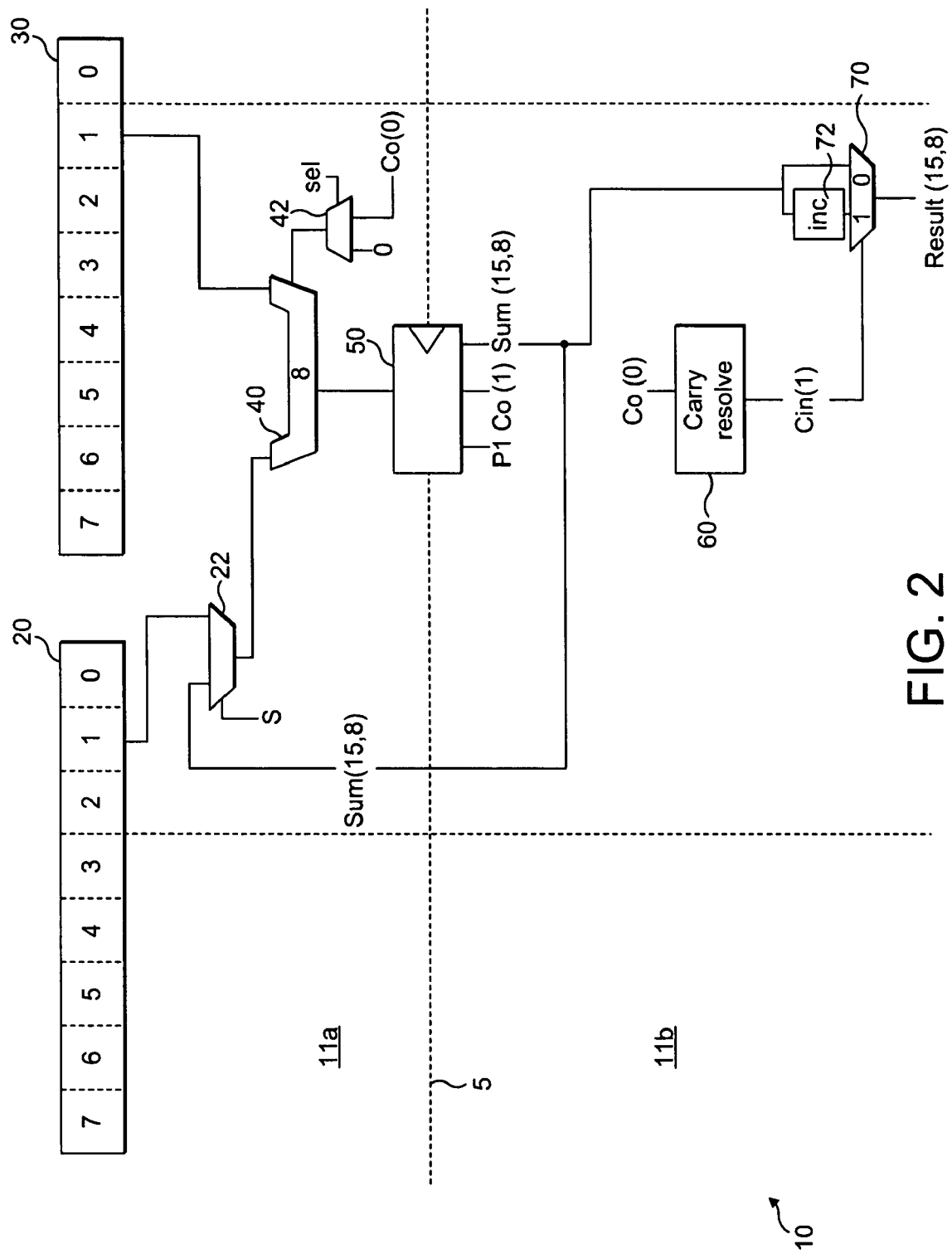
FIG. 2 schematically illustrates a portion of an adder within a data processing apparatus according to an embodiment of the present invention FIG. 3 schematically illustrates a portion of an adder similar to that of FIG. 1 with an additional saturate function.

FIG. 2 schematically show a portion of adder 35 of FIG. 1 in more detail. Adder 35 is split into 8 adder logic stages each operable to add 8 bit data elements. Each data value stored in a register 20, 30 is dealt with in eight 8 bit data portions, each data portion being sent to a different adder logic stage during the addition. In the embodiment shown the adder logic stage operable to add data portion 1 corresponding to bits 8 to 15 of the data values stored in registers 20 and 30 is shown in detail. The addition is performed in two steps. The first step being performed in one cycle and being shown in section 11a and the second step being performed in a second clock cycle and being shown in section 11b, the steps being schematically divided by dotted line 5.

The adder logic stage shown comprises an 8 bit adder 40. The adder 40 receives bits 8 to 15 of the two data values stored in registers 20 and 30 during a first cycle and adds these together along with any carry from the preceding stage where bits 0 to 7 were added. The adder 40 then generates an intermediate sum Sum(15,8), a propagate value P1, and a carry out value CO(1) for this stage. These are output to flipflop 50.

Although in this embodiment, the data value is divided into 8 bit portions, it can of course be divided into different sized portions. In this embodiment, it has been found convenient to use eight 8 bit additions as with a 64 bit data value it has been found that these can be performed in a single cycle with the carries propagating between the different stages where necessary.

As can be seen adder 40 is a carry propagate adder producing a single carry out bit CO(1) a propagate value P1 and an intermediate sum value SUM(15,8). The carry out value CO(0) from preceding stage 0 is input to adder 40 via multiplexer 42 which has a select signal on it. The select signal SEL can be used to deselet the carry and prevent the carry from the preceding stage entering the adder in certain situations, and in particular, in the case of SIMD addition where the preceding stage is adding a different data element. In the embodiments shown, the select signal is only activated and a 0 rather than the carry value selected, for the adder adding data portions 4 of data values A and B. Data portion 4 of these data values corresponds to the lowest significant bits of the second data element. In this way carrys between the two data elements are inhibited in SIMD processing.

The output of the flop 50 is then, in the next cycle, input to the next step 11b of the processing apparatus. Step 11b provides further processing logic to complete the addition. This further processing logic comprises carry resolve logic 60, multiplexer 70 and incrementer 72. The carry out and propagate from preceding stages are entered into the carry resolve. As this is stage 1 of the addition the carry out from the preceding stage, stage 0 is input to the carry resolve logic 60 and no other values are input to produce a carry in for this stage Cin(1). The intermediate sum for this stage SUM(15,8) is input to multiplexer 70, directly and also following incrementer 72. Multiplexer 70 has the carry in output from the carry resolve as its select signal. Thus, as soon as the value of carry in Cin(1) is known the final result of the sum for stage 1 relating to data portions 1, can be output via multiplexer 70. Thus, although the carry in is known late in many of the stages as it requires carrys and propagates from previous stages, once it is known the final result can be almost immediately output without needing to add the carry value to the intermediate sum. Thus, it is advantageous to simply produce the result from a multiplexer having the sum and incremented sum as its inputs rather than incrementing the value after the carry in is known.

The above shows the processing that occurs in a single adder logic stage during the addition of data portion 1 of data values A and B. As can be seen this occurs in two cycles in this embodiment. It could be that the stages are performed in a single longer cycle or that each step in the process requires multiple cycles. If it is performed in a single cycle then clearly the flip flop would not be between the stages as is shown.

In the case that a third data value is required to be added to the two data values A and B before the final result is known, for example, in the case where each step takes a cycle as is shown and back-to-back addition of three values is required, embodiments of the present invention feedback the intermediate values which are known before the final result. This is done by feeding back the intermediate sum of the first step 11a of the addition that was derived by the carry propagate adder 40 with the carry out derived from a carry propagate adder of a previous stage to carry propagate adder 40. In such a case, the third data value is entered into register 30 and the select signal S on multiplexer 22 is set such that the input with the intermediate sum SUM(15,8) is input to adder 40 rather than the value stored in register 20. Thus, sum (15,8) and portion 1 of the third data values corresponding to bits 8 to 15 stored in register 30 are input to adder 40 along with a carry out CO(0) from a previous stage and these are added together by this carry propagate adder 40. This produces a further intermediate SUM(15,8)' which is input to flip flop 50 along with further propagate values P1' and further carry out values CO(0)'. These are then input to the second step of the processing apparatus 10b and a final result of the three data values can be derived using carry resolve logic 60, multiplexer 70 and incrementer 72 in the same way as it was used when adding two data values. Thus, three data values can be added together, in this embodiment in three cycles, by the use of the intermediate sum from a carry propagate adder. Furthermore, SIMD addition can be performed simply by allowing or inhibiting the carries from preceding stages to propagate.

Figure 3:
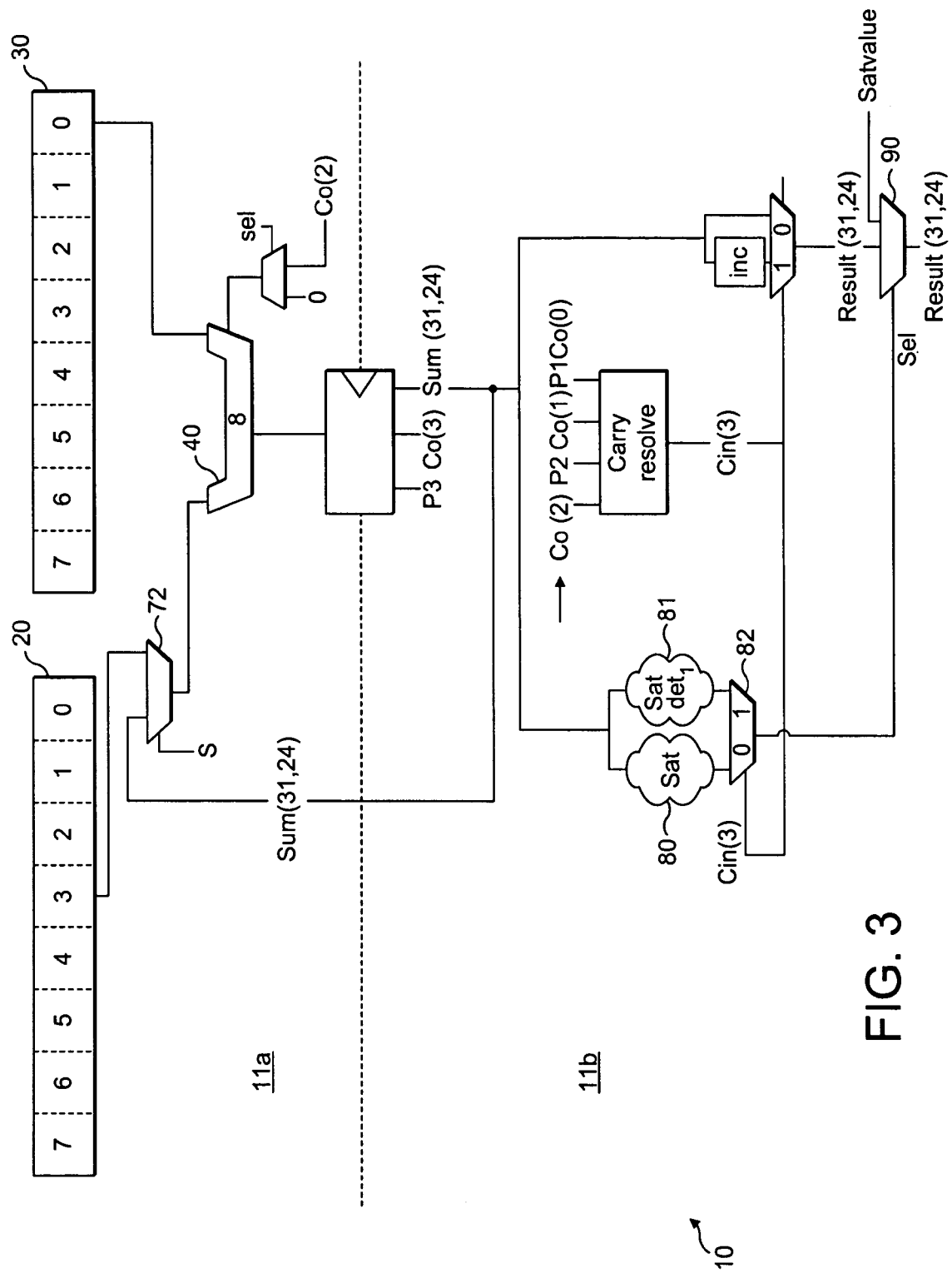

FIG. 3 shows an apparatus according to an embodiment of the present invention that is similar to that of FIG. 2 except that it is also able to saturate the result where required.

In this embodiment, it is the adder stage adding data portions 3 of data values stored in register 20 and register 30 that is shown. Data portion 3 is the most significant portion of one of the data elements within the data value. It is only the most significant data portions that need to be examined when deciding whether or not saturation should occur. As can be seen data portion 3 is added in the same way as data portions 1 were added in FIG. 1, but in the final stage it is decided whether or not this data value needs to be saturated. This is done using saturation detection logic 80, 81, this saturation detection logic decides if either the sum or the incremented sum need to be saturated. Thus, when the carry value is known this can be in input as a select signal to a multiplexer 82 and the saturation result for the appropriate sum, i.e. the sum itself or the sum incremented by one depending whether or not the carry is a one can be output. This result is then input as a select signal to a further multiplexer 90 and it is used to select wither a saturation value or the result of the addition is to be output.

Thus, embodiments of the invention are also extremely efficient in calculating if saturation is required in parallel to calculating the final sum of an addition. This is because this value can be derived from the intermediate sum produced by a carry propagate adder, and its incremented value. Thus, although the final carry in is known late it is simply used to select an answer rather than being needed for further processing to derive the final result.

A further embodiment is described below.

A SIMD implementation referred to as Neon, has an integer accumulator which is situated at the end of the multiply pipe, occupying stages N4 (ACC1) and N5 (ACC2), with some pre-formatting in N3 (PRE-ACC). The accumulator handles all accumulate operations required by the Neon instruction set, including multiply-accumulates, shift-accumulates, and absolute difference-accumulates. As such, it is comprised of two 64-bit saturating adds.

Table Error! No text of specified style in document.: List of Instructions handled by Neon Integer Accumulate

| Instruction Type | List of Neon Instructions |
|---|---|
| Multiply/Multiply-Accumulate | VMUL, VMLA, VMLS, VQDMLH, VQRDMLH, VQDMUL, VQDMLA, VQDMLS |
| Shift-Accumulate | VSRA, VRSRA |
| Absolute Difference-Accumulate | VABA, VSMA |

Theory 64-bit add as 8 8-bit adds

The accumulator uses the fact that a 64-bit add can be accomplished in two stages: 1)eight 8-bit adds, and 2)carry resolution of the eight 8-bit results. Take the 64-bit add $A[63:0]+B[63:0]=Sum[63:0]$ as an example. We can perform the add by doing step one:

| | |
|---|---|
| Byte0: | A[07:00] + B[07:00] = {Cout[0], R[07:00]} |
| Byte1: | A[15:08] + B[15:08] = {Cout[1], R[15:08]} |
| Byte2: | A[23:16] + B[23:16] = {Cout[2], R[23:16]} |
| Byte3: | A[31:24] + B[31:24] = {Cout[3], R[31:24]} |
| Byte4: | A[39:32] + B[39:32] = {Cout[4], R[39:32]} |
| Byte5: | A[47:40] + B[47:40] = {Cout[5], R[47:40]} |
| Byte6: | A[55:48] + B[55:48] = {Cout[6], R[55:48]} |
| Byte7: | A[63:56] + B[63:56] = {Cout[7], R[63:56]} |

In step two, we need to resolve the carries. For example, if Cout[0]=1, then Sum[15:08]=R[15:08]+1, else Sum[15:08] =R[15:08]. For byte 2, Sum[23:16]=R[23:16] if Cout[1]=1 or if Cout[0]=1 and P[1]=1, where P[I]=1 if a carry-in would propagate through R[I*8+7:I*8]. One way to get P[I] is:

$$P[i] = \&R[i*8+7:i*8]$$

Thus we get the following equations for the carry-in to each byte:

Cin[0] = 0
Cin[1] = Cout[0]
Cin[2] = Cout[1] + P[1]Cout[0]
Cin[3] = Cout[2] + P[2]Cout[1] + P[2]P[1]Cout[0]
Cin[4] = $G_{0-3}$
Cin[5] = Cout[4] + P[4]$G_{0-3}$
Cin[6] = Cout[5] + P[5]Cout[4] + P[5]P[4]$G_{0-3}$
Cin[7] = Cout[6] + P[6]Cout[5] + P[6]P[5]Cout[4] + P[6]P[5]P[4]$G_{0-3}$
$G_{0-3}$ = Cout[3] + P[3]Cout[2] + P[3]P[2] + Cout[1] + P[3]P[2]P[1]Cout[0]

Pipeline Stages

Figure 4:
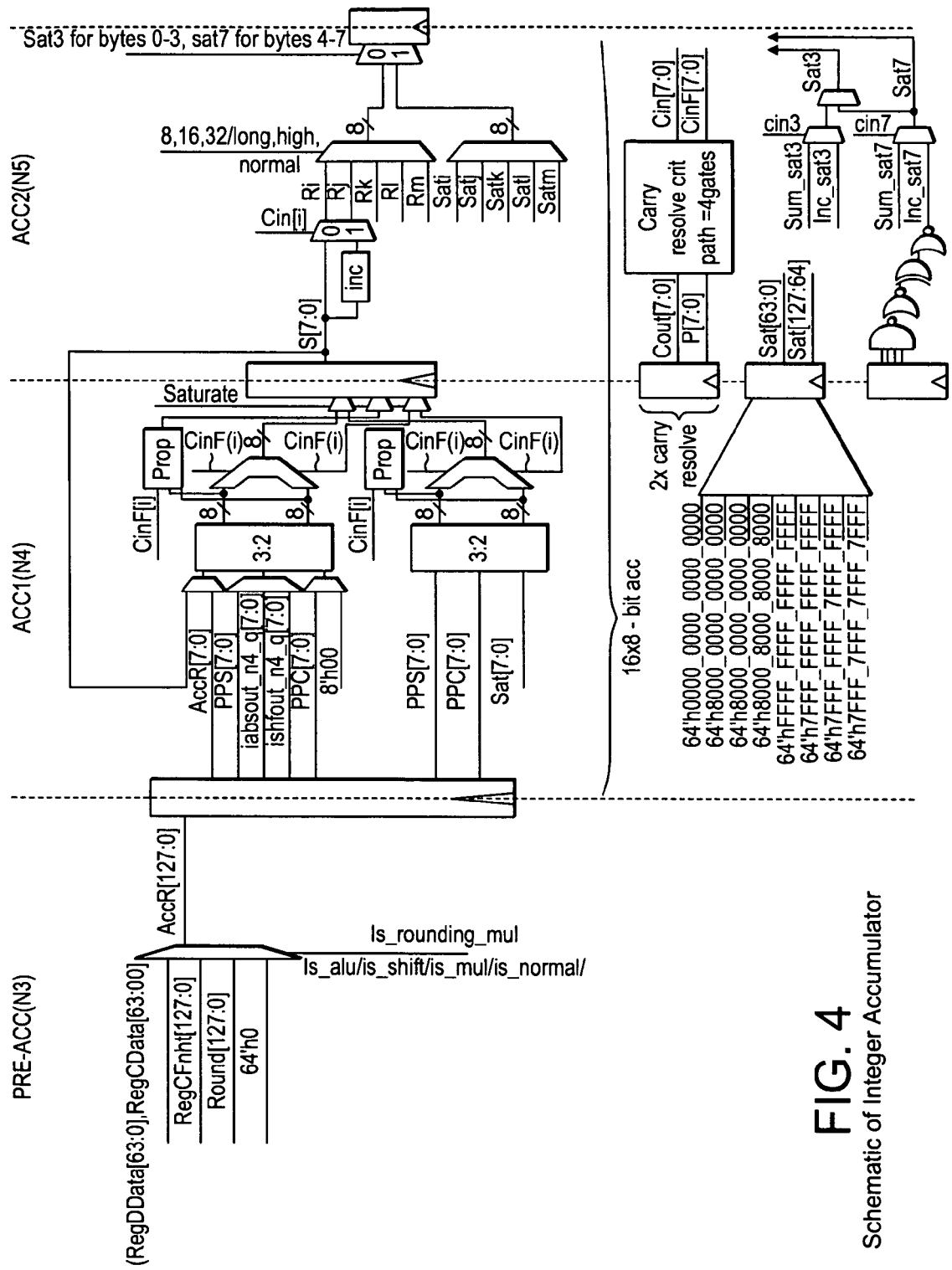
FIG. 4 shows a schematic of a SIMD Integer Accumulate Unit.

The accumulator is basically two 64-bit saturating adders, split over two cycles to meet timing requirements. In addition, the operands coming from the multiplier are in redundant form, and must be compressed with the accumulate value before being sent to the adder. In the first cycle (ACC1), then, a mux chooses the appropriate operands (which have been sent through a 3:2 counter if necessary) for the adder. Then 8-bits of the add are resolved. In the second cycle (ACC2), the add is completed, saturation is detected and the result is organized (by moving bytes) into the correct final result. FIG. 4 shows a schematic of the Neon Integer Accumulate Unit. The following sections will describe all of the functionality in greater detail.

PRE-ACC (N3)

The PRE-ACC stage is used only for multiply-accumulate operations or rounding multiplies. A mux chooses between the correctly formatted accumulate value read from the register file or the appropriate rounding value. The following sections describe the logic necessary for generating these values.

Generating the Round Value

The correct round value can be generated based only on the data size of the operands. Table 1 gives the correct rounding value based on data size.

TABLE 1

Generation of Round Value for Rounding Multiplies

| Data Size | Value of Round[127:0] |
|---|---|
| 8 bit | No rounding for 8 bit |
| 16 bit | 128'h0000_8000_0000_8000_0000_8000_0000_8000 |
| 32 bit | 128'h0000_0000_8000_0000_0000_0000_8000_0000 |

Formatting the Register Read

For multiply-accumulates, the accumulate value read from the register may have to be formatted based on the result type. Table 2 gives the expressions for each byte of the formatted accumulate value based on the value read from the register and the type of operation.

TABLE 2

Format register read accumulate value for use in accumulator

| Bits of RegCFmt[127:0] | Expression |
|---|---|
| RegCFmt[7:0] | RegCData[7:0] |
| RegCFmt[15:8] | {8{~is8bit}} & RegCData[15:8] |
| RegCFmt[23:16] | {8{is8bit}} & RegCData[15:8] \| {8{is32bit}} & RegCData[23:16] |
| RegCFmt[31:24] | {8{is32bit}} & RegCData[31:24] |
| RegCFmt[39:32] | {8{~is32bit}} & RegCData[23:16] |
| RegCFmt[47:40] | {8{is16bit}} & RegCData[31:24] |
| RegCFmt[55:48] | {8{is8bit}} & RegCData[31:24] |
| RegCFmt[63:56] | 8'h00 |
| RegCFmt[71:64] | RegCData[39:32] |
| RegCFmt[79:72] | {8{~is8bit}} & RegCData[47:40] |
| RegCFmt[87:80] | {8{is8bit}} & RegCData[47:40] \| {8{is32bit}} & RegCData[55:48] |
| RegCFmt[95:88] | {8{is32bit}} & RegCData[63:56] |
| RegCFmt[103:96] | {8{~is32bit}} & RegCData[55:48] |
| RegCFmt[111:104] | {8{is16bit}} & RegCData[63:56] |
| RegCFmt[119:112] | {8{is8bit}} & RegCData[63:56] |
| RegCFmt[127:120] | 8'h00 |

Accumulate Operand

An accumulate operand mux is required to choose round value, register read accumulate value, or formatted register accumulate value. This muxflop is a 4:1 mux, with controls and data inputs described in Table 3.

TABLE 3

Controls for Mux to select appropriate Acc/Round value

| Signal | Value = 1 if | Data Selected |
|---|---|---|
| Sel0 | VSRA, VRSRA, VABA, VSMA, VMLA(long), VMLS(long), VQDMLA, VQDMLS | {RegDData[63:0], RegCData[63:0]} |
| Sel1 | VMLA(normal), VMLS(normal) | RegCFmt[127:0] |
| Sel2 | VQRDMLH | Round[127:0] |
| Sel3 | Sel0 = 0 and Sel1 = 0 and Sel2 = 0 | 128'h0 |

ACC1 (N4)

ACC1 contains the first part of the two 64-bit adders in the form of sixteen 8-bit adds. A multiplexor selects the appropriate operands from the possible sources (multiplier, shifter, or ALU) and sends them to the adders. The add then takes place in 8 bit chunks, with each chunk generating an 8-bit sum, a carry-out, and the propagate term.

Mux to Select Operands

The possible sources for the adder are the multiplier, the shifter, or the ALU. If the source is the multiplier, the operand is still in redundant format, and must be sent through a 3:2 counter with an accumulate value to accommodate accumulate operations before it can be sent to the adder. In addition, the accumulate value could come from a register, or be currently stored in the ACC1 flops (for back-to-back accs). Also, if the accumulate term is stored in the ACC1 flops, it's possible that the previous accumulate saturated, which will not be known until near the end of the cycle. So a special path is implemented in which a saturated value is used for the accumulate value, with it's result being muxed in at the end of the cycle if necessary. The following table shows which source is chosen for each of the handled instructions.

TABLE 4

Neon Accumulator Source Operands

| Source | Instructions that choose that source |
|---|---|
| Multiplier | VMUL, VMLA, VMLS, VQDMLH, VQRDMLH, VQDMUL, VQDMLA, VQDMLS |
| Shifter | VSRA, VRSRA |
| ALU | VABA, VSMA |

Propagate Term

The propagate term for the 8-bit sum is harder to compute in this case because the adder has a carry-in. A normal propagate term would be just $P=\&(A[7:0]|B[7:0])$. With the carry-in, the propagate term becomes:

$$P=\&((A[7:0]\hat{}B[7:0])\hat{}\{G[6:1],Cin\})$$

where G[I]=A[I] & B[I].

This logic results in 4 gates+inv worst case (where one of the gates is a complex gate, e.g. OAI).

Rounding

For multiplies that require rounding (VQRDMLH), the rounding value is muxed in instead of the register read accumulate value in the N3 pipe stage. This is possible since there are no rounding, accumulating multiplies.

Saturate Value

Following table shows the logic for generating the saturate value

TABLE 5

Generating saturate value

| Bits of Saturate value | Expression |
|---|---|
| Sat[30:0] | {31{pos_mul_result ^ is_subtract}} |
| Sat[31] | is16bit & ~(pos_mul_result ^ is_subtract) \| is32bit & (pos_mul_result ^ is_subtract) |
| Sat[62:32] | {31{pos_mul_result ^ is_subtract}} |
| Sat[63] | pos_mul_result ^ is_subtract |
| Sat[94:64] | {31{pos_mul_result ^ is_subtract}} |
| Sat[95] | is16bit & ~(pos_mul_result ^ is_subtract)\| is32bit & (pos_mul_result ^ is_subtract) |
| Sat[126:96] | {31{pos_mul_result ^ is_subtract}} |
| Sat[127] | pos_mul_result ^ is_subtract |

ACC2 (N5)

ACC2 contains the logic to resolve the carries and complete the two 64-bit adds, detect saturation, and reformat the bytes of the result based on the instruction type.

Carry Resolution

Carry resolution can be taken care of in a manner similar to that described in 0. It's a little more complicated because the carries propagate only for appropriate SIMD sizes. Given S[127:0], Cout[15:0], and P[15:0] from the eight 8-bit adders in ACC1, the equations for the carry-ins of each byte are:

```
Cin[0] = 0
Cin[1] = Cout[0]
Cin[2] = is8bitCout[1] + is8bitP[1]Cout[0]
Cin[3] = Cout[2] + is8bitP[2]Cout[1] + is8bitP[2]P[1]Cout[0]
Cin[4] = is32bitG_{0-3}
Cin[5] = Cout[4] + is32bitP[4]G_{0-3}
Cin[6] = is8bitCout[5] + is8bitP[5]Cout[4] + is32bitP[5]P[4]G_{0-3}
Cin[7] = Cout[6] + is8bitP[6]Cout[5] + is8bitP[6]P[5]Cout[4] + is32bitP[6]P[5]P[4]G_{0-3}
G_{0-3} = Cout[3] + P[3]Cout[2] + P[3]P[2] + Cout[1] + P[3]P[2]P[1]Cout[0]
```

The equations for Cin[15:8] are identical.

The above equations result in a worst case 4-gate delay (Cin [7] looks like NAND4-NAND4-NAND2-NAND4).

If Cin[I]=0, then Sum[8*I+7:8*I]=S[8*I+7:8*I], else Sum[8*I+7:8*I]=S[8*I+7:8*I]+1. So Cin can be used as the select on a 2-to-1 mux to choose the correct value for Sum.

Since Sum[127:0] is not available until midway through ACC2, the feedback path from ACC2 to ACC1 sends S[127:0] back, and sends the Cin[7:0] to be the carry-in inputs to the 8-bit adders to obtain the correct result for the next cycle.

Result Formatting

The Neon instruction set requires results in a variety of formats and sizes. To handle this, there is a mux to select the appropriate bytes of Sum[127:0] for Result[127:0]. Below table shows the required formats and which instructions require them.

TABLE 6

Required Result Format for Neon Integer Accumulator

| Format | List of Instructions requiring this format |
|---|---|
| Normal Result | VABA, VSMA, VMUL, VMLA, VMLS, VSRA, VRSRA |
| Long Result | VABA, VMUL, VMLA, VMLS, VQDMUL, VQDMLA, VQDMLS |
| Top half of result | VQDMLH, VQRDMLH |

Table 7 shows which byte of Sum[127:0] should be selected for each byte of Result[127:0], given the data size and required format. This results in a worst case 5:1 mux in the datapath. The controls can be made one-hot and can be derived straight from instruction decode.

TABLE 7

Selection table for Result[15:0]

| Result byte number | 8 bit low | 8 bit high | 8 bit long | 16 bit low | 16 bit high | 16 bit long | 32 bit low | 32 bit high | 32 bit long |
|---|---|---|---|---|---|---|---|---|---|
| 0 | 0 | 1 | 0 | 0 | 2 | 0 | 0 | 4 | 0 |
| 1 | 2 | 3 | 1 | 1 | 3 | 1 | 1 | 5 | 1 |
| 2 | 4 | 5 | 2 | 4 | 6 | 2 | 2 | 6 | 2 |
| 3 | 6 | 7 | 3 | 5 | 7 | 3 | 3 | 7 | 3 |
| 4 | 8 | 9 | 4 | 8 | 10 | 4 | 8 | 12 | 4 |
| 5 | 10 | 11 | 5 | 9 | 11 | 5 | 9 | 13 | 5 |
| 6 | 12 | 13 | 6 | 12 | 14 | 6 | 10 | 14 | 6 |
| 7 | 14 | 15 | 7 | 13 | 15 | 7 | 11 | 15 | 7 |
| 8 | — | — | 8 | — | — | 8 | — | — | 8 |
| 9 | — | — | 9 | — | — | 9 | — | — | 9 |
| 10 | — | — | 10 | — | — | 10 | — | — | 10 |
| 11 | — | — | 11 | — | — | 11 | — | — | 11 |
| 12 | — | — | 12 | — | — | 12 | — | — | 12 |
| 13 | — | — | 13 | — | — | 13 | — | — | 13 |
| 14 | — | — | 14 | — | — | 14 | — | — | 14 |
| 15 | — | — | 15 | — | — | 15 | — | — | 15 |

Saturation Detection

Saturation must be detected for saturating multiplies, which have only signed 16 and signed 32 bit data types. So we only need to look for signed overflow and signed underflow on bytes 3, 7, 11, and 15 of the result. Signed overflow can occur only if the two operands are both positive, signed underflow only if the operands are both negative. So a sat_en[3:0] signal is generated in ACC1 (4 bits, one for each 32 bit lane) based on the sign of the inputs. If sat_en=1 and the sign of the result does not match the sign of the inputs, then overflow occurred, and the result should be saturated.

```
pos_mul_result[x] = 1 if lane x mul result is positive
pos_acc[x] = 1 if lane x accumulate value is positive
sat_en[x] =~ (pos_mul_result[x] ^ pos_acc[x])
```

Since the sum is not resolved until the middle of ACC2, saturation is detected using S[127:0] speculatively and resolved when the result is resolved. For example, for byte 3, we want to know if result[31]==expected_sign. We do this as follows:

```
result[31:24] = cin[3]? S[31:24] + 1:S[31:24]
byte3_sat_occurred = cin[3]? ~ pos_mul_result[0]^S[31]^(&S[30:24]) :~
pos_mul_result[0
```

Then from the sat_en[3:0], sat_occurred signal for each byte, and the data size, sat_occurred[15:0] can be generated, one bit for each byte. It's meaning is "byte[x] should be saturated if sat_occurred[x]==1'b1".

We claim:

1. A data processing apparatus operable to sum data values said data processing apparatus comprising:
    a plurality of adder logic stages arranged in parallel with each other;
    control logic operable in response to receipt of a request to sum two data values to forward portions of said two data values to respective ones of said plurality of adder logic stages, such that a first adder logic stage receives a predetermined number of lowest significant bits from each of said two data values and subsequent adder logic stages receive said predetermined number of successively higher significant bits from each of said two data values, each of said plurality of adder logic stages being operable to perform a carry propagate addition of said received portions to generate an intermediate sum, a propagate value and a carry; and
    further logic stages operable to receive said intermediate sums, carries and propagate values generated from said plurality of adder logic stages and to combine said received intermediate sums, carries and propagate values to produce a sum of said two data values; wherein
    said control logic is operable in response to receipt of a request to add a third data value to said sum of said two data values, received before said further logic has completed said sum, to forward portions of said third data value to respective ones of said plurality of adder logic stages and to feedback said intermediate sums generated by said plurality of adder logic stages and to selectively feedback a carry generated from a preceding adder logic stage; and
    said plurality of adder logic stages are operable to perform a carry propagate addition of said fedback intermediate sums and carrys with respective portions of said third data value to generate a plurality of further intermediate sums, further carrys and further propagate values; and
    wherein said further logic stages are operable to receive said plurality of further intermediate sums, further carries and further propagate values and to combine said received further intermediate sums, carries and propagate values to produce a sum of said three data values.

2. A data processing apparatus according to claim 1, said data values comprising at least two data elements said data processing apparatus being operable to process said at least two data elements in parallel in at least two data lanes, each of said at least two data elements comprising a multiple of said predetermined number of bits, said control logic being operable to inhibit said carry feedback between adder logic stages processing data elements from different data lanes and to feedback other carries.

3. A data processing apparatus according to claim 2, said further logic comprising:
    first saturation detection logic operable to detect if at least two intermediate sums should be saturated, said at least two intermediate sums being said most significant intermediate sums derived from each of said at least two data elements, and to output at least two results; and
    second saturation detection logic operable to detect if said at least two intermediate sums incremented by one should be saturated and to output at least two results, said further logic being operable to select at least two of said at least four results to be output in response to at least two signals generated by said further logic.

4. A data processing apparatus according to claim 3, wherein said at least two signals generated by said further logic comprise a carry in signal generated by said at least two carry resolve logic stages corresponding to said at least two most significant intermediate sums derived from each of said at least two data elements, said further logic being operable to select a respective output of said first saturation logic in response to a carry in being zero and to select a respective output of said second saturation logic in response to a carry in being one.

5. A data processing apparatus according to claim 2, said data element comprising said predetermined number of bits, and said control logic being operable to inhibit said carry feedback between all adder logic stages.

6. A data processing apparatus according to claim 1, wherein said carry comprises a single bit.

7. A data processing apparatus according to claim 1, wherein said predetermined number of bits comprises eight bits.

8. A data processing apparatus according to claim 1, said further logic comprising a plurality of carry resolve logic stages corresponding to said plurality of adder logic stages and operable to combine said carrys and propagate values from preceding stages to produce carry ins for each stage, said further logic being operable to combine said intermediate sums and carry ins to generate a sum of said data values.

9. A data processing apparatus according to claim 1, wherein said further logic comprises first saturation detection logic operable to detect if said most significant intermediate sum should be saturated and to output a result and second saturation detection logic operable to detect if said most significant intermediate sum incremented by one should be saturated and to output a result, said further logic being operable to select one of said outputs in response to a signal generated by said further logic.

10. A data processing apparatus according to claim 9, wherein said signal generated by said further logic comprises a carry in signal generated by said carry resolve logic, said further logic selecting said output of said first saturation logic being operable in response to said carry in being zero and to select said output of said second saturation logic in response to said carry in being one.

11. A data processing apparatus according to claim 1, wherein said control logic is operable to generate said intermediate sum, propagate value and carry during a first step; and
    said further logic stages are operable to produce said sum of said two data values during a second step; and
    said control logic is operable in response to receipt of said request to add a third data value to said sum of said two data values to control said plurality of adder logic stages to generate a plurality of further intermediate sums, further carrys and further propagate values during said second step; and
    said further logic stages are operable to combine said received further intermediate sums, carries and propagate values to produce a sum of said three data values during a third step.

12. A data processing apparatus according to claim 11, wherein said first step is performed during one clock cycle, said second step is performed during a subsequent clock cycle and said third step is performed during a clock cycle following said subsequent cycle.

13. A data processing method for summing data values said method comprising the steps of:

in response to a request to add two data values:

forwarding portions of said two data values to respective ones of a plurality of adder logic stages arranged in parallel, such that a first adder logic stage receives a predetermined number of lowest significant bits from each of said two data values and subsequent adder logic stages receive said predetermined number of successively higher significant bits from each of said two data values;

performing a carry propagate addition on each of said received portions at each of said plurality of adder logic stages and generating an intermediate sum, a propagate value and a carry; and forwarding said intermediate sum, propagate value and carry to further logic stages and combining said intermediate sums, carries and propagate values within said further logic stages to produce a sum of said two data values; and in response to receiving a request to add a third data value to said sum of said two data values before producing said sum of said two data values:

forwarding portions of said third data value to respective ones of said plurality of adder logic stages and feeding back said intermediate sum generated by each of said plurality of adder logic stages and selectively feeding back a carry generated from a preceding adder logic stage;

performing a carry propagate addition of said fedback intermediate sums and carrys with said portions of said third data value within each of said plurality of adder logic stages to generate a plurality of further intermediate sums, further carrys and further propagate values; and forwarding said further intermediate sums, further carrys and further propagate values to said further logic stages and to combining said received further intermediate sums, carries and propagate values within said further logic stages to produce a sum of said three data values.

14. A means for data processing comprising:

a plurality of adding means for adding data arranged in parallel with each other;

control means operable in response to receipt of a request to sum two data values to forward portions of said two data values to respective ones of said plurality of adding means, such that a first adding means for adding data receives a predetermined number of lowest significant bits from each of said two data values and subsequent adding means for adding data receive said predetermined number of successively higher significant bits from each of said two data values, each of said plurality of adding means being operable to perform a carry propagate addition of said received portions to generate an intermediate sum, a propagate value and a carry; and further means for receiving said intermediate sums, carries and propagate values generated from said plurality of adding means and for combining said received intermediate sums, carries and propagate values to produce a sum of said two data values; wherein said control means is operable in response to receipt of a request to add a third data value to said sum of said two data values, received before said further means has completed said sum, to forward portions of said third data value to respective ones of said plurality of adding means and to feedback said intermediate sum generated by each of said plurality of adding means and to selectively feedback a carry generated from a preceding adding means; and each of said plurality of adding means is operable to perform a carry propagate addition of said fedback intermediate sums and carrys with said portions of said third data value to generate a plurality of further intermediate sums, further carrys and further propagate values; and wherein said further means is operable to receive said plurality of further intermediate sums, further carries and further propagate values and to combine said received further intermediate sums, carries and propagate values to produce a sum of said three data values.

* * * * *